United States Patent
Sawai

(10) Patent No.: US 7,907,629 B2
(45) Date of Patent: Mar. 15, 2011

(54) WIRELESS COMMUNICATION APPARATUS, WIRELESS COMMUNICATION SYSTEM, WIRELESS COMMUNICATION METHOD AND PROGRAM

(75) Inventor: Ryou Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/170,767

(22) Filed: Jul. 10, 2008

(65) Prior Publication Data

US 2009/0016376 A1    Jan. 15, 2009

(30) Foreign Application Priority Data

Jul. 10, 2007  (JP) ................. P2007-181410

(51) Int. Cl.
*H04J 3/16* (2006.01)
(52) U.S. Cl. .................... 370/465; 370/509
(58) Field of Classification Search .......... 370/465, 370/466, 469, 471, 473, 474, 475, 476, 498, 370/503, 509, 512, 328, 329, 330, 345, 350
See application file for complete search history.

(56) References Cited

U.S. PATENT DOCUMENTS

| | | | | |
|---|---|---|---|---|
| 7,075,906 B2 * | 7/2006 | Douglas et al. | ............ | 370/328 |
| 7,079,508 B2 * | 7/2006 | Ayyagari et al. | ............ | 370/329 |
| 7,656,902 B2 * | 2/2010 | Yi et al. | ............ | 370/474 |
| 7,784,076 B2 * | 8/2010 | Demircin et al. | ............ | 725/81 |
| 2001/0021170 A1 * | 9/2001 | Hansson et al. | ............ | 370/217 |
| 2004/0004975 A1 * | 1/2004 | Shin et al. | ............ | 370/471 |
| 2005/0013263 A1 * | 1/2005 | Kim et al. | ............ | 370/320 |
| 2005/0152358 A1 | 7/2005 | Giesberts et al. | | |
| 2005/0152359 A1 | 7/2005 | Giesberts et al. | | |
| 2005/0201337 A1 * | 9/2005 | Heo et al. | ............ | 370/335 |
| 2006/0009200 A1 * | 1/2006 | Jung et al. | ............ | 455/414.1 |
| 2007/0089037 A1 * | 4/2007 | Jiang | ............ | 714/776 |
| 2007/0167180 A1 * | 7/2007 | Ramesh et al. | ............ | 455/502 |
| 2009/0016280 A1 * | 1/2009 | Iyer et al. | ............ | 370/329 |

FOREIGN PATENT DOCUMENTS

| | | |
|---|---|---|
| JP | 2005-027248 | 1/2005 |
| JP | 2005-167358 | 6/2005 |
| JP | 2007-037196 | 2/2007 |

* cited by examiner

*Primary Examiner* — Chi H. Pham
*Assistant Examiner* — Kevin Mew
(74) *Attorney, Agent, or Firm* — Finnegan, Henderson, Farabow, Garrett & Dunner, L.L.P.

(57) ABSTRACT

A wireless communication apparatus includes a sender identity evaluating portion that evaluates whether a sender of consecutively received packets is the same, and a physical layer control portion that controls a physical layer using an evaluation result if the sender identity evaluating portion evaluates that a sender of consecutively received packets is the same.

17 Claims, 5 Drawing Sheets

WIRELESS COMMUNICATION APPARATUS, WIRELESS COMMUNICATION SYSTEM, WIRELESS COMMUNICATION METHOD AND PROGRAM

CROSS REFERENCES TO RELATED APPLICATIONS

The present invention contains subject matter related to Japanese Patent Application JP 2007-181410 filed in the Japan Patent Office on Jul. 10, 2007, the entire contents of which being incorporated herein by reference.

BACKGROUND OF THE INVENTION

1. Field of the Invention

The present invention relates to a wireless communication apparatus, a wireless communication system, a wireless communication method and a program.

2. Description of the Related Art

In a wireless communication system such as a wireless LAN, packets which are transmitted consecutively from the same sender are received in some cases. For example, Japanese Unexamined Patent Application Publication No. 2005-167358 describes the technique that, when determining that two or more packets with the same destination are received consecutively, creates one transmission frame by regarding the packets as consecutive data.

[Patent document 1] Japanese Unexamined Patent Application Publication No. 2005-167358
[Patent document 2] Japanese Unexamined Patent Application Publication No. 2005-2724
[Patent document 3] Japanese Unexamined Patent Application Publication No. 2007-3719

SUMMARY OF THE INVENTION

If packets are transmitted consecutively from the same sender, it is necessary in a receiver end to reconfigure RF settings (e.g. VGA, LNA etc.) for each received packet and to remeasure evaluation results such as packet synchronous evaluation and packet format evaluation and estimation results. This is because the destination of consecutively transmitted packets is not necessarily the same in a packet transmission system such as a wireless LAN (WLAN) where packet transmission is performed with regular inter frame space (IFS) intervals. This is also because the format of consecutively transmitted packets is not necessarily the same.

When a receiver end evaluates a sender, it identifies a sender by decoding a packet and checking identification information at a MAC header of the packet. It is thus unable to determine whether the other end is the same or not before starting decoding in a physical layer. Therefore, even when packets are transmitted consecutively from the same sender, it fails to effectively utilize the information which is obtained from the previously received packet. It is thereby necessary to perform the same processing as in the reception of the previous packet again for the next received packet, which causes an increase in power consumption and an increase in processing circuit scale. Further, even after a sender is identified based on identification information at a MAC header or the like, the same processing as for the previous packet is performed for the next received packet, which still leads to an increase in power consumption and an increase in processing circuit scale.

In light of the foregoing, it is desirable to provide new, improved wireless communication apparatus, wireless communication system, wireless communication method and program which effectively utilize the information of a previously received packet and simplify processing when packets are transmitted consecutively from the same sender.

According to an embodiment of the present invention, there is provided a wireless communication apparatus which includes a sender evaluating portion to evaluate whether a sender of consecutively received packets is the same, and a control portion to control a physical layer using an evaluation result if the sender evaluating portion evaluates that a sender of consecutively received packets is the same.

In this configuration, the sender evaluating portion evaluates whether a sender of consecutively received packets is the same, and the physical layer is controlled using an evaluation result if it is evaluated that a sender of consecutively received packets is the same. Thus, in the physical layer, the processing of various estimations and evaluations regarding a packet can be performed in the same manner as those of the previous packet using the evaluation result indicating that the sender is the same, and it is thereby possible to significantly simplify the processing.

In the above wireless communication apparatus, the sender evaluating portion may include a packet interval detecting portion to detect a time interval between consecutively received packets, and a packet interval evaluating portion to evaluate whether a time interval between the packets corresponds to a consecutive transmission interval to the same apparatus that is defined by a specification, and the sender evaluating portion may evaluate that a sender of consecutively received packets is the same if the time interval between the packets corresponds to the consecutive transmission interval. In this configuration, a time interval between consecutively received packets is detected, and a sender of consecutively received packets is evaluated to be the same if the time interval corresponds to a consecutive transmission interval to the same apparatus that is defined by a specification. Thus, when it is assured that two consecutive packets are transmitted from the same transmitting apparatus if a time interval between the consecutively received packets is 2 μ[sec] as in the RIFS bursting specification in a next generation wireless LAN system which is specified by the IEEE802.11a to g and IEEE802.11n standards, it is possible to evaluate whether the sender is the same based on a time interval between packets.

In the above wireless communication apparatus, the packet interval detecting portion may detect a time interval from a previous packet during packet synchronous detection. This configuration enables evaluation whether the sender is the same at the time of packet synchronous detection. It is thereby possible to start the control of the physical layer based on an evaluation result at an early stage.

In the above wireless communication apparatus, the sender evaluating portion may evaluate whether a sender of consecutively received packets is the same based on identification information in a PHY header of a received packet. In this configuration, because a PHY header is located in a relatively front side of a packet, it is possible to start the control of the physical layer based on an evaluation result at an early stage by evaluating whether a sender of consecutively received packets is the same based on identification information in a PHY header.

In the above wireless communication apparatus, the sender evaluating portion may evaluate whether a sender of consecutively received packets is the same based on identification information in a MAC header of a received packet. In this configuration, because a MAC header is located in a relatively front side of actual transmission data, it is possible to start the control of the physical layer based on an evaluation result at an early stage.

In the above wireless communication apparatus, the sender evaluating portion may evaluate whether a sender of consecutively received packets is the same based on information of a scheduled wireless connection line usage period in a MAC header of a received packet. In this configuration, it is possible to evaluate whether the sender is the same when a scheduled wireless connection line usage period in a MAC header is set longer than the length of a packet, for example.

In the above wireless communication apparatus, the physical layer may include an automatic gain control portion to perform automatic gain control of a received packet, and the automatic gain control portion may perform automatic gain control using at least a part of an automatic gain control result obtained when receiving a previous packet if a sender of consecutively received packets is the same. In this configuration, because automatic gain control is performed using at least a part of an automatic gain control result that is obtained when receiving a previous packet if a sender of consecutively received packets is the same, it is possible to reduce power consumption and reduce the size of a circuit that forms the automatic gain control portion.

In the above wireless communication apparatus, the automatic gain control portion may perform automatic gain control by performing weighted-averaging on automatic gain control results of consecutively received packets if a sender of the consecutively received packets is the same. In this configuration, because automatic gain control is performed by weighted-averaging automatic gain control results of consecutively received packets, it is possible to improve the accuracy of the automatic gain control.

In the above wireless communication apparatus, the physical layer may include a packet format information acquiring portion to acquire information regarding a format of a received packet, and the control portion may control the physical layer using the information regarding a format that is obtained when receiving a previous packet if a sender of consecutively received packets is the same. In this configuration, because the physical layer is controlled using the information regarding a packet format that is obtained when receiving a previous packet if a sender of consecutively received packets is the same, it is possible to simplify the processing of acquiring a packet format.

In the above wireless communication apparatus, the physical layer may include a signal information detecting portion to detect signal information containing a modulation method or a coding rate of a received packet, and the control portion may control the physical layer using the signal information that is obtained when receiving a previous packet if a sender of consecutively received packets is the same. In this configuration, because the physical layer is controlled using the signal information that is obtained when receiving a previous packet if a sender of consecutively received packets is the same, it is possible to simplify the processing of acquiring signal information.

In the above wireless communication apparatus, the physical layer may include a packet synchronous portion to detect synchronism of a received packet, and the packet synchronous portion may detect synchronism of a received packet using at least a part of a synchronous detection result that is obtained when receiving a previous packet if a sender of consecutively received packets is the same. In this configuration, because synchronism of a received packet is detected using at least a part of a synchronous detection result that is obtained when receiving a previous packet if a sender of consecutively received packets is the same, it is possible to simplify the processing of packet synchronous detection.

In the above wireless communication apparatus, the packet synchronous portion may detect synchronism of a received packet by performing weighted-averaging on synchronous detection results of consecutively received packets. In this configuration, because synchronism of a received packet is detected by performing weighted-averaging on synchronous detection results of consecutively received packets, it is possible to improve the accuracy of packet synchronous detection.

In the above wireless communication apparatus, the packet synchronous portion may detect a frequency band of a received packet, and the control portion may control the physical layer using a frequency band that is obtained when receiving a previous packet if a sender of consecutively received packets is the same. In this configuration, because the physical layer is controlled using a frequency band that is obtained when receiving a previous packet if a sender of consecutively received packets is the same, it is possible to simplify the processing of detecting a frequency band.

In the above wireless communication apparatus, the physical layer may include a frequency offset correcting portion to correct a frequency offset of a received packet, and the frequency offset correcting portion may correct a frequency offset of a received packet using a frequency offset value that is obtained when receiving a previous packet if a sender of consecutively received packets is the same. In this configuration, because a frequency offset of a received packet is corrected using a frequency offset value that is obtained when receiving a previous packet if a sender of consecutively received packets is the same, it is possible to simplify the processing of correcting a frequency offset.

In the above wireless communication apparatus, the frequency offset correcting portion may correct a frequency offset of a received packet by performing weighted-averaging on frequency offset values of consecutively received packets. In this configuration, because a frequency offset of a received packet is corrected by performing weighted-averaging on frequency offset values of consecutively received packets, it is possible to improve the accuracy of frequency offset correction.

According to another embodiment of the present invention, there is provided a wireless communication system including a transmitting apparatus and a receiving apparatus connected through a wireless communication network, in which the receiving apparatus includes a sender evaluating portion to evaluate whether a sender of consecutively received packets is the same, and a control portion to control a physical layer using an evaluation result if the sender evaluating portion evaluates that a sender of consecutively received packets is the same.

In this configuration, whether a sender of consecutively received packets is the same is evaluated, and the physical layer is controlled using an evaluation result if it is evaluated that a sender of consecutively received packets is the same. Thus, in the physical layer, the processing of various estimations and evaluations regarding a packet can be performed in the same manner as those of the previous packet using the evaluation result indicating that the sender is the same, and it is thereby possible to significantly simplify the processing.

According to another embodiment of the present invention, there is provided a wireless communication method including the steps of evaluating whether a sender of consecutively received packets is the same, and controlling a physical layer using an evaluation result if a sender of consecutively received packets is evaluated to be the same.

In this configuration, whether a sender of consecutively received packets is the same is evaluated, and the physical layer is controlled using an evaluation result if it is evaluated that a sender of consecutively received packets is the same. Thus, in the physical layer, the processing of various estimations and evaluations regarding a packet can be performed in the same manner as those of the previous packet using the evaluation result indicating that the sender is the same, and it is thereby possible to significantly simplify the processing.

According to another embodiment of the present invention, there is provided a program for causing a computer to implement functions which includes a means of evaluating whether a sender of consecutively received packets is the same, and a means of controlling a physical layer using an evaluation result if a sender of consecutively received packets is evaluated to be the same.

In this configuration, a computer implements functions to evaluate whether a sender of consecutively received packets is the same and to control the physical layer using an evaluation result if it is evaluated that a sender of consecutively received packets is the same. Thus, in the physical layer, the processing of various estimations and evaluations regarding a packet can be performed in the same manner as those of the previous packet using an evaluation result indicating that the sender is the same, and it is thereby possible to significantly simplify the processing.

According to the embodiments of the present invention, there are provided a wireless communication apparatus, a wireless communication system, a wireless communication method and a program which effectively utilize the information of a previously received packet and simplify processing when packets are transmitted consecutively from the same sender.

DETAILED DESCRIPTION OF THE PREFERRED EMBODIMENTS

Figure 1:
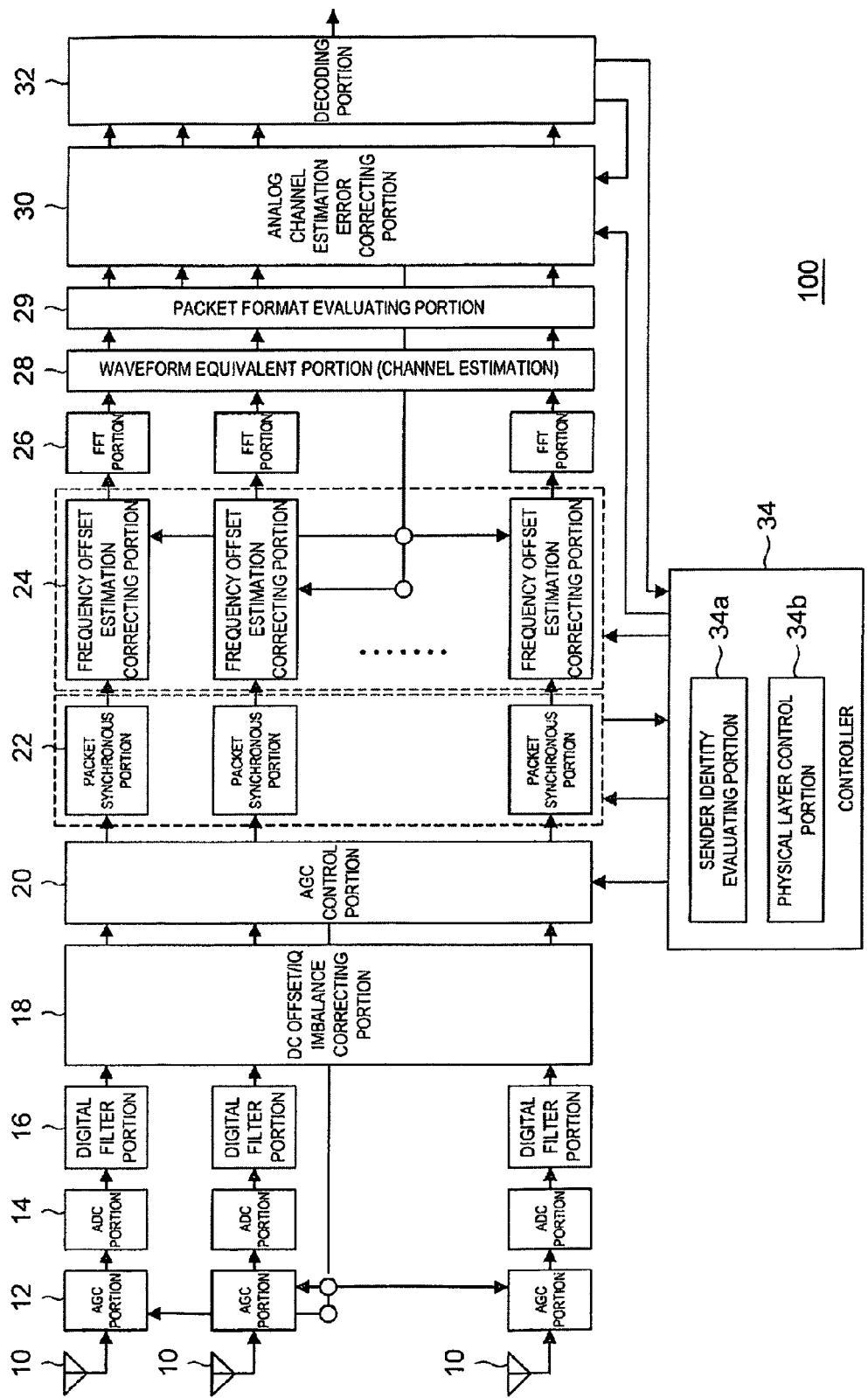
FIG. 1 is a diagram showing the configuration of a wireless communication apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is a diagram showing the configuration of a wireless communication apparatus according to an embodiment of the present invention. FIG. 1 illustrates a multi-input multi-output orthogonal frequency division multiplexing (MIMO-OFDM) receiver 100 as an example of a communication apparatus, and it shows the configuration of a physical layer (PHY layer) of the MIMO-OFDM receiver 100. As shown in FIG. 1, the MIMO-OFDM receiver 100 includes a plurality of antennas 10, automatic gain control (AGC) portion 12, an analog-digital converter (ADC) portion 14, a digital filter portion 16, a DC offset/IQ imbalance correcting portion 18, an AGC control portion 20, a packet synchronous portion 22, a frequency offset estimation correcting portion 24, an FFT portion 26, a waveform equivalent portion 28, a packet format evaluating portion 29, an analog channel estimation error correcting portion 30, and a decoding portion 32. The MIMO-OFDM receiver 100 also includes a controller 34 which controls each element of the physical layer shown in FIG. 1.

Referring to FIG. 1, signals are received by the plurality of antennas 10, the gain is controlled by the AGC portion 12 in an analog region, and each signal is converted from analog to digital by the ADC portion 14. On the converted signal, the correction of a DC offset value and the correction of the imbalance of I, Q signals are performed by the DC offset/IQ imbalance correcting portion 18, and the corrected signal is input to the AGC control portion 20. The AGC control portion 20 controls the gain control by the AGC portion 12 based on the input signal. The packet synchronous portion 22 detects packet synchronous. The frequency offset estimation correcting portion 24 corrects and eliminates an error of a frequency offset estimation value based on the output of an estimating circuit of a residual frequency offset value which is placed in the analog channel estimation error correcting portion 30. After that, the received signal is supplied from the frequency offset estimation correcting portion 24 to the FFT portion 26 where it is fast Fourier transformed, and then sent to the waveform equivalent portion 28.

In the MIMO-OFDM receiver 100 of this embodiment, a plurality of array antennas receive signals, the FFT portion 26 performs fast Fourier transform, the waveform equivalent portion 28 performs processing such as space-time coding, and the decoding portion 32 performs decoding. The waveform equivalent portion 28 also performs channel estimation. The analog channel estimation error correcting portion 30 estimates the channel of a received signal and corrects the channel based on a signal which is decoded by the decoding portion 32, thereby updating the channel. Further, the packet format evaluating portion 29 which evaluates a packet format is placed between the waveform equivalent portion 28 and the analog channel estimation error correcting portion 30.

Figure 2:
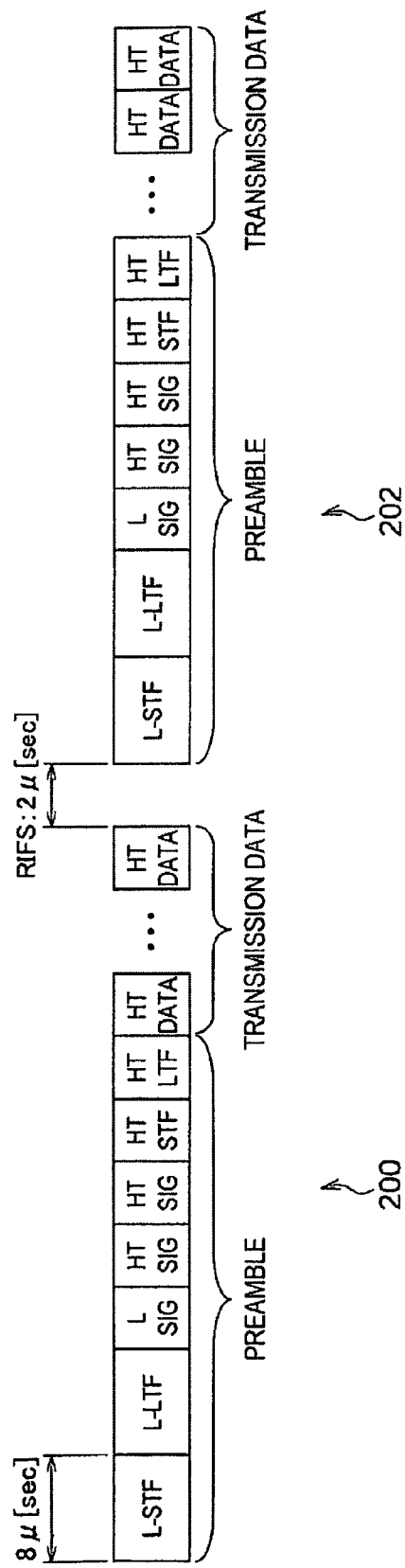
FIG. 2 is a diagram showing the data structure of a packet which is received by a MIMO-OFDM receiver.

FIG. 2 shows the data structure of a packet which is received by the MIMO-OFDM receiver 100, and it illustrates the case of receiving two packets 200 and 202 which are transmitted consecutively. In FIG. 2, the packet 202 is the currently received packet, and the packet 200 is the packet which is received immediately before receiving the packet 202.

FIG. 2 illustrates the case where a packet format is the Mixed mode which is compliant with the IEEE802.11n standard. Referring to FIG. 2, data of L-STF, L-LTF, L-SIG, HT-SIG, HT-SIG, HT-STF and HT-LTF are sequentially arranged as a preamble from the head of a packet, and HT-DATA which is actual transmission data is arranged after that. In the preamble data, synchronization is maintained by L-STF, the radio condition is judged by L-LTF, and the subsequent signal is equalized. The format of a signal is detected by L-SIG.

HT-SIG, HT-STF and HT-LTF are the fields which are characteristic to the Mixed mode. HT-SIG is high-throughput signal information, which contains information such as a data transmission rate and a modulation method. HT-STF is a high-throughput short training field. HT-LTF is a high-throughput long training field, which contains channel estimation information. There are the same number of HT-LTF as the number of MIMO streams.

The packets shown in FIG. 2 are compliant with the specification called RIFS bursting in a next generation wireless LAN system which is specified by the IEEE802.11a to g and IEEE802.11n standards. As shown in FIG. 2, in the RIFS bursting specification, the time interval between consecutive packets which are transmitted from a single transmitting apparatus to the same apparatus is set to 2 μ [sec]. Thus, it is assured in the RIFS bursting specification that, if the time interval of the packets which are received consecutively by the MIMO-OFDM receiver 100 is 2 μ [sec], the two consecutive packets are transmitted from the same transmitting apparatus. The time interval from the previous packet 200 is detected by detecting synchronism when receiving L-STF of the packet 202. It is thereby possible to detect whether the time interval from the previous packet 200 is 2 μ [sec] while receiving L-STF data.

Generally, when identifying a sender in a receiving end, a receiver receives all packets in a physical layer, then transfers decoded received data to a MAC layer (upper layer) and determines a sender based on the address of the data in the MAC layer. In this technique, a sender of a received packet is not identified until the reception of packets is completed.

On the other hand, the MIMO-OFDM receiver 100 of this embodiment receives the packet 202 and detects synchronism by L-STF data at the head of the packet. Until the reception of L-STF is completed, the synchronous detection is completed and the interval between the packet 200 and the packet 202 is detected. In the IEEE802.11a to g and IEEE802.11n standards, L-STF is specified as 8 μ[sec] (2-OFDM). Thus, the MIMO-OFDM receiver 100 can detect the interval from the previous packet 200 during the period of 8 μ[sec] immediately after starting the reception of the packet 202 before receiving the entire data of the packet 202. It then evaluates whether the interval between the packet 202 and the packet 200 is 2 μ[sec], thereby determining whether the currently received packet 202 is transmitted from the same sender as the previous packet 200. It is thereby possible to identify a sender terminal at an earlier stage compared with the technique of determining a sender from the address of data in the MAC layer.

Accordingly, when the MIMO-OFDM receiver 100 of this embodiment receives the packets 200 and 202 which are transmitted consecutively, it detects the synchronism by L-STF of the next packet 202 while decoding OFDM symbols of the previous packet 200 in the decoding portion 32 of the physical layer, thereby detecting the interval between the previous packet 200 and the packet 202 at an early stage. If the time interval between the consecutive packets 200 and 202 is 2 μ[sec], which corresponds to the RIFS bursting specification, the receiver 100 determines that the currently received packet 202 is transmitted from the same sender as the previous packet 200 and feeds back the determination result to the physical layer.

Referring back to FIG. 1, the controller 34 includes a sender identity evaluating portion 34a and a physical layer control portion 34b. The determination as to whether the consecutively received packets 200 and 202 are transmitted from the same sender is performed by the sender identity evaluating portion 34a of the controller 34 based on a result of synchronous detection. If the sender identity evaluating portion 34a evaluates that the sender of the packets 200 and 202 is the same, the physical layer control portion 34b of the controller 34 controls each element in the physical layer based on the evaluation result. At this time, the processing regarding the currently received packet 202 is simplified based on the information of the previously received packet 200. A program for functioning the sender identity evaluating portion 34a and the physical layer control portion 34b of the controller 34 may be stored in an internal or external memory of the controller 34 or the like.

Although a method that evaluates the sender of consecutive packets based on the time interval according to the RIFS bursting is described in the above example, a technique of evaluating the sender of a packet is not limited to the above technique. In the case of evaluating whether the sender is the same based on a packet interval, the packet interval may be changed according to the specification. In a system where signaling information is added at the beginning of a preamble, a flag which can be evaluated at the level of the physical layer may be inserted so as to determine a sender from the flag. For example, because a reserve bit is prepared at the PHY header of a packet in the IEEE802.11n standard, a 1 bit of flag which indicates a sender may be prepared in the reserve bit at the PHY header of the packets 200 and 202, thereby determining whether the sender of the packets 200 and 202 is the same from the flag. In this case, the flag is identified based on the data which is decoded by the decoding portion 32, and the sender identity evaluating portion 34a of the controller 34 evaluates whether the sender is the same or not.

Further, a sender may be identified based on identification information in the MAC header of the packets 200 and 202 from a signal which is decoded by the decoding portion 32, thereby evaluating whether the sender of the packets 200 and, 202 is the same. Because the MAC deader is placed before a payload of transmission data, it is possible to detect whether the sender is the same or not at an early stage.

Alternatively, whether the packet 200 and the packet 202 are transmitted from the same sender may be evaluated based on the setting of network allocation vector (NAV) in the MAC header. NAV is information which indicates a time period that is set for media reservation (a scheduled wireless connection line usage period), and transmission by another apparatus is inhibited while NAV is set. Because the period of NAV can be set longer than the length of a packet in the IEEE802.11n standard, if NAV that is longer than the length of the packet 200 is set to the previous packet 200, it may be determined that the subsequent packet 202 is transmitted form the same sender as the packet 200. In this case, if NAV that is longer than the length of the packet 200 is not set, it may be determined that the subsequent packet 202 is transmitted form a different sender from the packet 200. Therefore, it is possible to reduce power consumption by setting the next receiving processing to a normal SIFS interval (16 μ[sec]) in advance.

Further, because whether the sender is the same or not can be evaluated in a system where packets are obviously transmitted consecutively such as a broadcasting system, the physical layer may be controlled based on the evaluation. Furthermore, in a cellular system, information which indicates consecutive transmission may be transmitted from a base station through a different channel, so that a receiving apparatus recognizes the consecutive transmission and simplifies the processing in the physical layer.

A technique of simplifying processing such as AGC setting, packet format detection, packet synchronous detection, channel estimation and channel updating when it is determined that the packet 202 is transmitted from the same sender as the packet 200 is described hereinafter.

[AGC Setting]

The AGC portion 12, the AGC control portion 20 and a block related thereto perform the setting of a low noise amplifier (LNA) and a variable gain amplifier (VGA) so as to perform automatic gain control (ACG) for each received packet. If it is determined that the packet 202 is transmitted from the same sender as the packet 200, the processing for taking over the setting of the previous packet 200 regarding the LNA and VGA setting is performed based on a command of the physical layer control portion 34b. By taking over the setting values which are set at the time of receiving the previous packet 200, it is possible to update and optimize the setting values from the state where a received power level is adjusted already. This enables highly accurate AGC operation than usual. Further, by completely taking over and using the setting values for the previous packet 200, it is possible to stop a series of operation of the AGC control for the packet 202, thereby reducing power consumption. Although a certain length of time is generally necessary until the setting values of AGC are converged, it is possible to shorten a convergence time by taking over the setting of the previous packet 200, thereby reducing an error in the AGC setting.

Specifically, the setting values at the time of receiving the previous packet 200 may be taken over by setting an initial value to a value of ±a dB (a is a prescribed value) to a reception level which is fixed at the time of receiving the previous packet 200 and starting the reception of the next packet 202 from the value, for example, thereby improving the characteristics of the AGC control. Further, power consumption can be reduced by setting a received gain control amplifier of the AGC portion 12 so as to stop a level measurement circuit without setting a gain level to a noise level during a certain length of time while waiting for receiving the next packet 202 after receiving the packet 200.

The AGC setting such as LNA and VGA is performed by the AGC control portion 20 of FIG. 1. In FIG. 1, a method in which the AGC control portion 20 in a digital signal region determines a gain control value of the AGC portion 12 in an analog region is shown as an example of the AGC configuration. According to the IEEE802.11a to g standard, the AGC setting is performed at the time of receiving L-STF, and it is set (locked) to a fixed value. Further, according to the IEEE802.11n standard, after AGC setting is performed at the time of receiving L-STF, AGC setting is performed again at the time of receiving HT-STF. If the sender of the packet 202 is the same as the sender of the packet 200, the AGC setting such as LNA and VGA can be significantly simplified when receiving the packet 202.

[Packet Format Detection]

By taking over an evaluation result of a packet format which is obtained from the packet 200 in the first receiving operation to the next received packet 202, it is possible to stop a plurality of steps of operation in evaluating circuits, thereby reducing power consumption. For example, in the IEEE802.11n standard, there are defined three kinds of preamble format: the legacy format which is compliant with the IEEE802.11a/g standard and the Mixed mode and the Green Field mode which are defined as the high throughput (HT) format. The detection of a packet format is performed in the packet format evaluating portion 29 which is shown in FIG. 1. The process of auto-discrimination of the three kinds of format first evaluates whether it is the legacy format or the high throughput format. If it is the high throughput format, the process then evaluates whether it is the Green Field mode. If it is not the Green Field mode, the process finally determines that it is the Mixed mode.

If it is determined that the sender of the packet 200 and the packet 202 is the same, an evaluation result for the previous packet 200 can be used in the evaluation of a packet format as well. For example, if the packet format of the previously received packet 200 is determined to be the Green Field mode, the packet format of the packet 202 can be also determined to be the Green Field mode. Thus, in the packet format detection also, it is possible to simplify the processing of evaluation based on a command from the physical layer control portion 34b. A different method may be used in the detection of a format. In this case also, it is possible to take over a detection result of the previous packet 200, thereby simplifying the processing and reducing power consumption.

Further, if it is determined that the packet 202 is a transmission packet from the same sender as the packet 200, the preamble format and the signal information (a modulation method, a coding rate etc.) can be determined to be the same as those of the previous packet, and it is therefore possible to eliminate the operation of a preamble format auto-detection circuit and the signal information extraction. This achieves the reduction of power consumption. The preamble format and the signal information of the previous packet are detected by the controller 34 based on the data which is decoded by the decoding portion 32.

At the time of synchronous detection by the packet synchronous portion 22, it is necessary that the packet synchronous portion 22 automatically evaluates whether a received packet is a transmission packet of either 20 MHz band or 40 MHz band, which causes an increase in circuit size of a synchronous detection portion. In this embodiment, if the sender of the packet 200 and the packet 202 is the same, an evaluation result of the previous packet 200 can be used for the next packet 202 based on a command from the physical layer control portion 34b. It is thereby possible to partly or entirely stop the operation for evaluating a band or perform clock gate control, thereby reducing power consumption.

Further, in the proprietary mode, the operation in the PHY preamble portion may be entirely stopped in the physical layer by transmitting, for the next packet 202, exactly the same information as the signal information such as a modulation method and a packet length of the previously transmitted packet 200. This significantly reduces power consumption.

[Packet Synchronous Detection and Frequency Offset Correction]

The packet synchronous detection is performed in the packet synchronous portion 22 shown in FIG. 1. Generally, the packet synchronous detection processing is performed using a method which combines autocorrelation and cross-correlation with a preamble pattern at the head of a packet. In the synchronous detection, the averaging for increasing the accuracy of synchronous detection, the rough timing adjustment, the fine timing adjustment and so on are performed. In this embodiment, if the sender of the packet 200 and the packet 202 is the same, circuits for performing the averaging, the rough timing adjustment and the fine timing adjustment are simplified or stopped, thereby reducing power consumption. Particularly, because the processing of autocorrelation and cross-correlation causes a heavy load on hardware, power consumption can be reduced by simplifying the processing.

Figure 3:
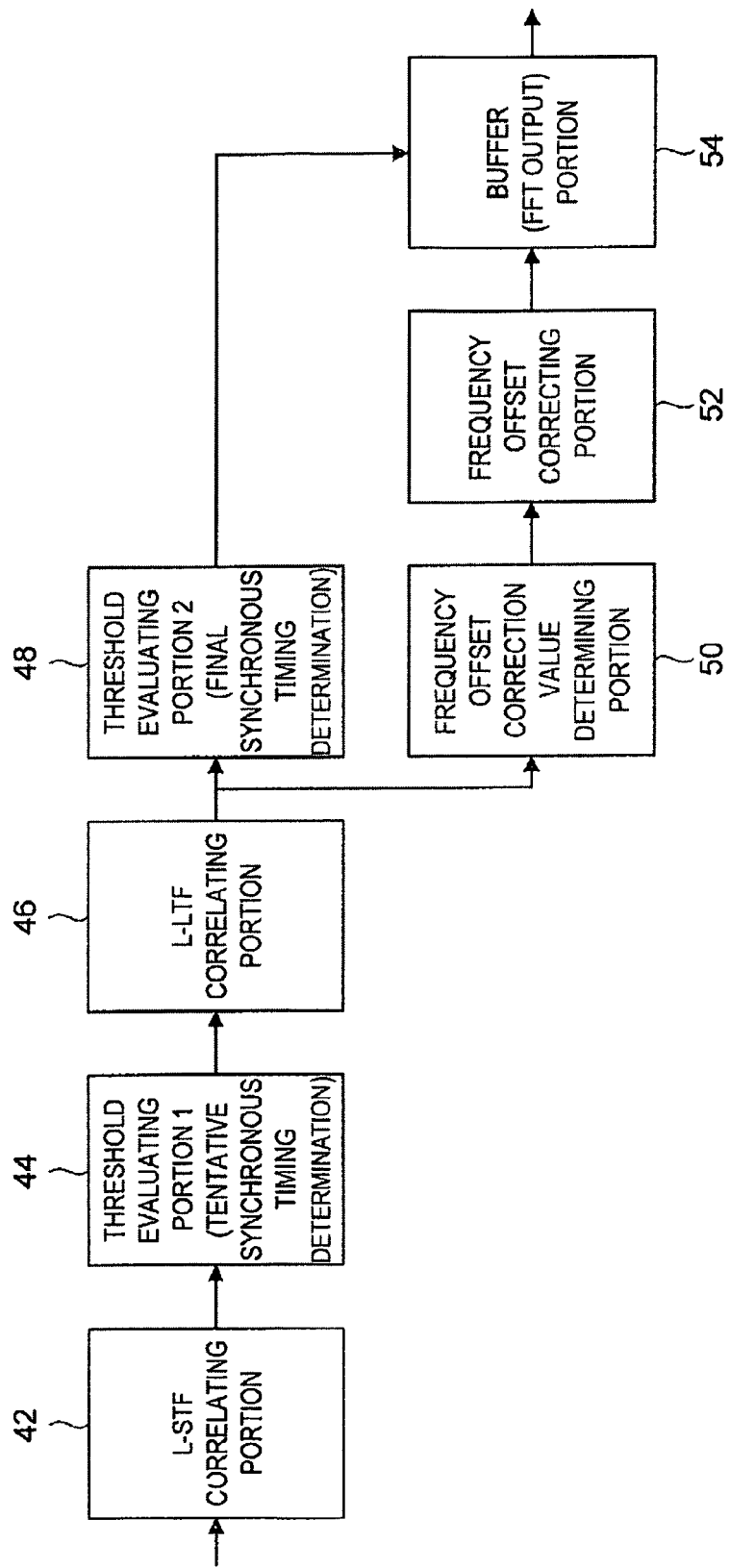
FIG. 3 is a diagram showing the exemplary configuration of a packet synchronous portion and a frequency offset estimation correcting portion.

FIG. 3 is a diagram showing the exemplary configuration of the packet synchronous portion 22 and the frequency offset estimation correcting portion 24. Referring to FIG. 3, the packet synchronous portion 22 and the frequency offset estimation correcting portion 24 includes an L-STF correlating portion 42, a threshold evaluating portion (1) 44, an L-LTF correlating portion 46, a threshold evaluating portion (2) 48, a frequency offset correction value determining portion 50, a frequency offset correcting portion 52 and a buffer (FFT output) portion 54.

In the configuration shown in FIG. 3, the packet synchronous portion 22 and the frequency offset estimation correcting portion 24 are largely divided into three blocks of the threshold evaluating portion (1) 44 (tentative synchronous timing determination), the threshold evaluating portion (2) 48 (final synchronous timing determination), and the frequency offset correcting portion 52.

Figure 4:
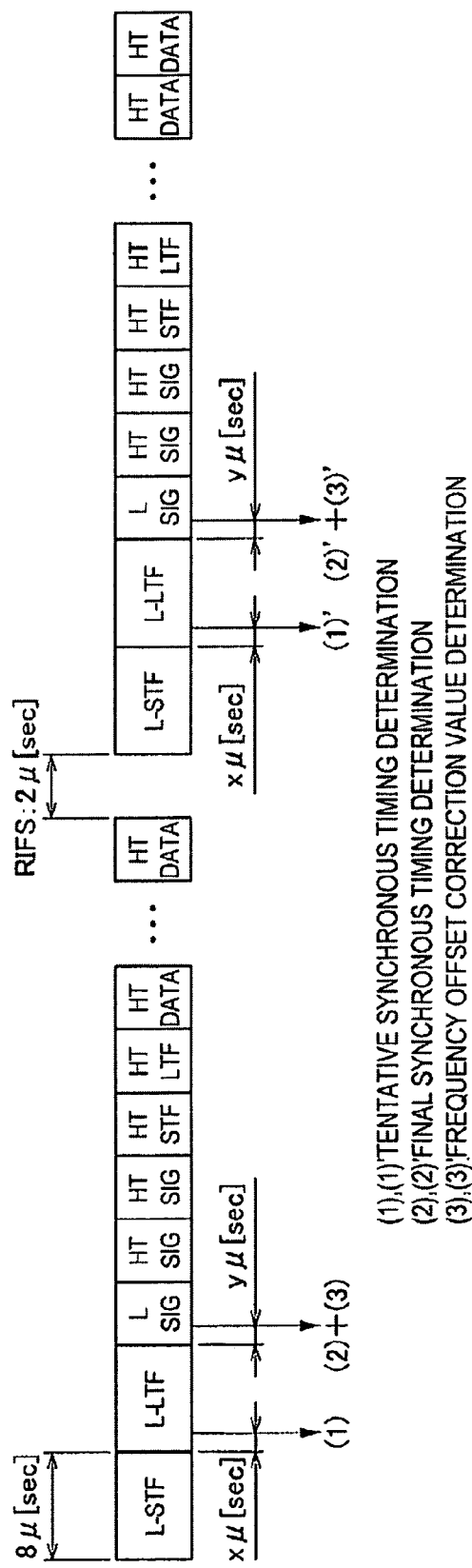
FIG. 4 is a diagram showing the exemplary operation of packet synchronous detection when receiving consecutive packets in a packet format in the Mixed mode compliant with the IEEE802.11n standard.

FIG. 4 shows the exemplary operation of packet synchronous detection when receiving consecutive packets in the packet format of the Mixed mode which is compliant with the IEEE802.11n standard. Referring to FIG. 4, the threshold evaluating portion (1) 44 determines a tentative synchronous timing from the correlation with L-STF after x μ[sec] from the end of the reception of L-STF. The processing of obtaining the correlation with L-STF is performed in the L-STF correlating portion 42. The rough adjustment of the synchronous timing is thereby performed. The threshold evaluating portion (2) 48 determines a final synchronous timing from the correlation with L-LTF after y μ[sec] from the end of the reception of L-LTF. The determined final synchronous timing is supplied from the buffer portion 54 to the FFT portion 26.

The frequency offset correction value determining portion 50 determines a frequency offset correction value based on the correlation with L-LTF after y μ[sec] from the end of the reception of L-LTF. The processing of obtaining the correction with L-LTF is performed in the L-LTF correlating portion 46. The frequency offset correcting portion 52 corrects a frequency offset using the frequency offset correction value which is determined by the frequency offset correction value determining portion 50. The fine adjustment of the synchronous timing is thereby performed. The data after the frequency offset correction is supplied from the buffer portion 54 to the FFT portion 26.

If it is determined that the sender of the packet 200 and the packet 202 is the same, in the processing of the second received packet 202, the circuit operation of the threshold evaluating portion (2) 48 and the frequency offset correcting portion 52 is performed in the same manner as in the processing of the previous packet, thereby saving the circuit operation of the threshold evaluating portion (2) 48 and the frequency offset correcting portion 52. This reduces power consumption. The characteristics may be further improved by assigning weights to a synchronous detection result of the previous packet 200 and a synchronous detection result of the packet 202. The detection result of the previous packet 200 includes all of the relevant estimation information which are used for determining a frequency offset correction value or a final synchronous timing.

The accuracy may be further improved by storing all the values of evaluating circuits such as the threshold evaluating portion (1) 44, the threshold evaluating portion (2) 48 and the frequency offset correction value determining portion 50 at the time of receiving the previous packet 200 and performing weighted-averaging according to a packet interval together with the values at the time of receiving the packet 202.

[Channel Estimation]

The channel estimation is performed by the waveform equivalent portion 28 shown in FIG. 1. In the channel estimation, a propagation path condition is generally estimated by reference to a preamble portion of a packet. Because the consecutive packets from the same sender are likely to pass through the same propagation path, it is possible to partly or entirely stop a channel estimation circuit or a circuit of calculating an inverse matrix or a circuit of calculating an inverse value of a complex value for channel estimation by taking over the channel estimation result from the previous packet 200 based on a command from the physical layer control portion 34b, thereby reducing power consumption. Further, the accuracy may be further improved by storing a part or all of the values of an evaluating circuit for channel estimation which are obtained at the time of receiving the previous packet 200 and weighted-averaging those values according to a packet interval together with the channel estimation value which is obtained at the time of receiving the packet 202. Alternatively, the accuracy may be further improved by storing the latest channel update value of the previous packet and performing weighted-averaging according to a packet interval.

[Channel Updating]

In the channel updating, a channel estimation result by the analog channel estimation error correcting portion 30 is updated based on a signal which is obtained by the decoding portion 32. If a received packet is sufficiently long for a channel change, it is necessary to appropriately update a channel estimation value which is obtained at the head of a packet. For example, a method of updating a channel generates a received waveform replica using an output of a demapper which is included in the decoding portion 32, a pilot data output and a decode output which is obtained as a result of decoding in the decoding portion 32, calculates an error of a channel estimation value and updates the error. If the sender identity evaluating portion 34a determines that the sender of the packet 200 and the packet 202 is the same, the channel updating can be simplified by taking over an evaluation value for updating from the previous packet 200 based on a command from the physical layer control portion 34b. At this time, the channel updating characteristics may be improved by using a technique of optimizing a forgetting coefficient or the like between received packets according to a packet transmission interval in association with the above-described channel estimation processing.

If the packet 200 and the packet 202 are transmitted from the same sender, the processing may be simplified with the use of a result which is obtained from the previous packet 200. This increases the probability of passing the check of CRC which is located at the last of packet transmission data compared with the case of performing the reception processing of the packet 202 from the beginning. This improves a throughput.

Figure 5:
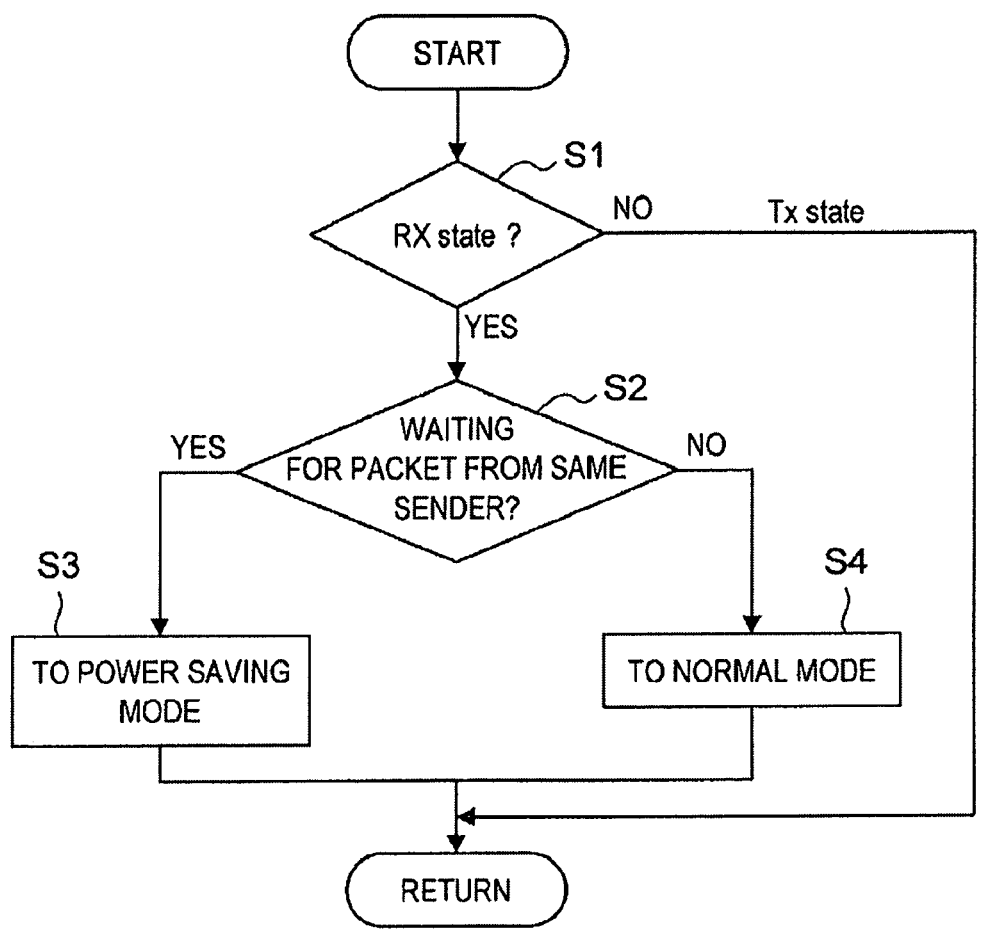
FIG. 5 is a flowchart showing the procedure of processing in a wireless communication apparatus.

The procedure of the processing in a wireless communication apparatus according to this embodiment is described hereinafter with reference to FIG. 5. The process first evaluates whether it is a reception state (RX state) or a transmission state (TX state) in Step S1 and proceeds to Step S2 if it is the reception state. On the other hand, if it is the transmission state, the process ends (RETURN).

In Step S2, the process evaluates whether it is the state of waiting for receiving a packet from the same sender as the previous packet. If the packet from the same sender is received, the process proceeds to Step S3 and enters the power saving mode. The process of Step S3 simplifies the processing according to the reception result of the previous packet by the above-described technique, thereby reducing power consumption. On the other hand, if the packet from the same sender as the previous packet is not received, the process proceeds to Step S4 and performs reception in the normal mode which is different from the power saving mode. The process ends after Steps S3 or S4 (RETURN).

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
   a sender evaluating portion to evaluate whether a sender of consecutively received packets is the same; and a control portion to control a physical layer using an evaluation result if the sender evaluating portion evaluates that a sender of consecutively received packets is the same, wherein the sender evaluating portion includes:
a packet interval detecting portion to detect a time interval between consecutively received packets; and
a packet interval evaluating portion to evaluate whether a time interval between the packets corresponds to a consecutive transmission interval to the same apparatus defined by a specification, and the sender evaluating portion evaluates that a sender of consecutively received packets is the same if the time interval between the packets corresponds to the consecutive transmission interval.

2. The wireless communication apparatus according to claim 1, wherein
the packet interval detecting portion detects a time interval from a previous packet during packet synchronous detection.

3. The wireless communication apparatus according to claim 1, wherein
the sender evaluating portion evaluates whether a sender of consecutively received packets is the same based on identification information in a PHY header of a received packet.

4. The wireless communication apparatus according to claim 1, wherein
the sender evaluating portion evaluates whether a sender of consecutively received packets is the same based on identification information in a MAC header of a received packet.

5. The wireless communication apparatus according to claim 4, wherein
the sender evaluating portion evaluates whether a sender of consecutively received packets is the same based on information of a scheduled wireless connection line usage period in a MAC header of a received packet.

6. The wireless communication apparatus according to claim 1, wherein
the physical layer includes an automatic gain control portion to perform automatic gain control of a received packet, and
the automatic gain control portion performs automatic gain control using at least a part of an automatic gain control result obtained when receiving a previous packet if a sender of consecutively received packets is the same.

7. The wireless communication apparatus according to claim 6, wherein
the automatic gain control portion performs automatic gain control by performing weighted-averaging on automatic gain control results of consecutively received packets if a sender of the consecutively received packets is the same.

8. The wireless communication apparatus according to claim 1, wherein
the physical layer includes a packet format information acquiring portion to acquire information regarding a format of a received packet, and
the control portion controls the physical layer using the information regarding a format obtained when receiving a previous packet if a sender of consecutively received packets is the same.

9. The wireless communication apparatus according to claim 1, wherein the physical layer includes a signal information detecting portion to detect signal information containing a modulation method or a coding rate of a received packet, and
the control portion controls the physical layer using the signal information obtained when receiving a previous packet if a sender of consecutively received packets is the same.

10. The wireless communication apparatus according to claim 1, wherein
the physical layer includes a packet synchronous portion to detect synchronism of a received packet, and
the packet synchronous portion detects synchronism of a received packet using at least a part of a synchronous detection result obtained when receiving a previous packet if a sender of consecutively received packets is the same.

11. The wireless communication apparatus according to claim 9, wherein
the packet synchronous portion detects synchronism of a received packet by performing weighted-averaging on synchronous detection results of consecutively received packets.

12. The wireless communication apparatus according to claim 10, wherein
the packet synchronous portion detects a frequency band of a received packet, and
the control portion controls the physical layer using a frequency band obtained when receiving a previous packet if a sender of consecutively received packets is the same.

13. The wireless communication apparatus according to claim 1, wherein
the physical layer includes a frequency offset correcting portion to correct a frequency offset of a received packet, and
the frequency offset correcting portion corrects a frequency offset of a received packet using a frequency offset value obtained when receiving a previous packet if a sender of consecutively received packets is the same.

14. The wireless communication apparatus according to claim 13, wherein
the frequency offset correcting portion corrects a frequency offset of a received packet by performing weighted-averaging on frequency offset values of consecutively received, packets.

15. A wireless communication system including a transmitting apparatus and a receiving apparatus connected through a wireless communication network, the receiving apparatus comprising:
a sender evaluating portion to evaluate whether a sender of consecutively received packets is the same; and
a control portion to control a physical layer using an evaluation result if the sender evaluating portion evaluates that a sender of consecutively received packets is the same,
wherein the sender evaluating portion includes:
a packet interval detecting portion to detect a time interval between consecutively received packets; and
a packet interval evaluating portion to evaluate whether a time interval between the packets corresponds to a consecutive transmission interval to the same receiving apparatus defined by a specification, and
the sender evaluating portion evaluates that a sender of consecutively received packets is the same if the time interval between the packets corresponds to the consecutive transmission interval.

16. A wireless communication method comprising the steps of:

evaluating whether a sender of consecutively received packets is the same; and controlling a physical layer using an evaluation result if a sender of consecutively received packets is evaluated to be the same, wherein the evaluating comprises:

detecting a time interval between consecutively received packets;

evaluating whether a time interval between the packets corresponds to a consecutive transmission interval to an apparatus defined by a specification, and evaluating that a sender of consecutively received packets is the same if the time interval between the packets corresponds to the consecutive transmission interval.

17. A non-transitory computer-readable medium including instructions, executable by a processor, for performing a wireless communication method, the method comprising:

evaluating whether a sender of consecutively received packets is the same; and controlling a physical layer using an evaluation result if a sender of consecutively received packets is evaluated to be the same, wherein the evaluating comprises:

detecting a time interval between consecutively received packets evaluating whether a time interval between the packets corresponds to a consecutive transmission interval to an apparatus defined by a specification, and evaluating that a sender of consecutively received packets is the same if the time interval between the packets corresponds to the consecutive transmission interval.

* * * * *